United States Patent
Zhou et al.

(10) Patent No.: US 11,841,290 B2
(45) Date of Patent: Dec. 12, 2023

(54) BEARING MONITORING/ANALYSIS SYSTEM

(71) Applicant: Waukesha Bearings Corporation, Waukesha, WI (US)

(72) Inventors: Jie Zhou, Pearland, TX (US); Barry Blair, Oconomowoc, WI (US)

(73) Assignee: Waukesha Bearings Corporation, Waukesha, WI (US)

( * ) Notice: Subject to any disclaimer, the term of this patent is extended or adjusted under 35 U.S.C. 154(b) by 0 days.

(21) Appl. No.: 17/675,874

(22) Filed: Feb. 18, 2022

(65) Prior Publication Data

US 2022/0170821 A1 Jun. 2, 2022

Related U.S. Application Data

(63) Continuation of application No. 15/986,495, filed on May 22, 2018, now Pat. No. 11,255,750.

(60) Provisional application No. 62/509,229, filed on May 22, 2017.

(51) Int. Cl.

| | |
|---|---|
| *G01M 13/045* | (2019.01) |
| *F16C 17/24* | (2006.01) |
| *F16C 17/03* | (2006.01) |
| *F16C 32/06* | (2006.01) |
| *F16C 17/06* | (2006.01) |
| *F16C 17/02* | (2006.01) |

(52) U.S. Cl.
CPC .......... *G01M 13/045* (2013.01); *F16C 17/03* (2013.01); *F16C 17/246* (2013.01); *F16C 32/0666* (2013.01); *F16C 17/028* (2013.01); *F16C 17/06* (2013.01); *F16C 2233/00* (2013.01)

(58) Field of Classification Search
CPC ..... G01M 13/045; G01M 13/04; F16C 17/03; F16C 32/0666; F16C 2233/00; F16C 17/246; F16C 17/028; F16C 17/24; F16C 17/06
USPC .................................. 73/593, 587, 659, 660
See application file for complete search history.

(56) References Cited

U.S. PATENT DOCUMENTS

| | | |
|---|---|---|
| 4,526,482 A | 7/1985 | Ide |
| 4,685,335 A | 8/1987 | Sato et al. |
| 4,884,449 A | 12/1989 | Nishimoto et al. |
| 5,140,858 A | 8/1992 | Nishimoto et al. |
| 5,489,155 A | 2/1996 | Ide |

(Continued)

FOREIGN PATENT DOCUMENTS

| | | |
|---|---|---|
| CN | 105408648 A | 3/2016 |
| CN | 206020034 | 3/2017 |

(Continued)

OTHER PUBLICATIONS

Office Action in Chinese Appln. No. 201880045135.6, dated Sep. 7, 2022, 17 pages (with English translation).

(Continued)

*Primary Examiner* — Nathaniel T Woodward
*Assistant Examiner* — Rose M Miller
(74) *Attorney, Agent, or Firm* — Fish & Richardson P.C.

(57) ABSTRACT

A bearing monitoring/analysis system includes an acoustic emission sensor positioned adjacent a fluid film bearing, component thereof, or adjacent structure such that the acoustic emission sensor may collect a signal from the bearing, wherein the signal may be analyzed to allow a user to gain information regarding the fluid film bearing.

12 Claims, 7 Drawing Sheets

(56) References Cited

U.S. PATENT DOCUMENTS

| | | |
|---|---|---|
| 5,513,917 A | 5/1996 | Ide et al. |
| RE38,373 E | 12/2003 | Bosley |
| 6,785,081 B2 | 8/2004 | Chapin et al. |
| 7,337,452 B2 | 2/2008 | Freeman et al. |
| 11,255,750 B2 | 2/2022 | Zhou et al. |
| 2002/0083779 A1 | 7/2002 | Narita et al. |
| 2003/0019297 A1 | 1/2003 | Fiebelkom et al. |
| 2003/0182788 A1 | 10/2003 | Fayeulle et al. |
| 2016/0069775 A1 | 3/2016 | Thomson |
| 2016/0215815 A1 | 7/2016 | Ryu et al. |
| 2016/0223496 A1 | 8/2016 | Klos et al. |
| 2018/0340862 A1 | 11/2018 | Zhou et al. |

FOREIGN PATENT DOCUMENTS

| | | |
|---|---|---|
| EP | 0060725 | 9/1982 |
| EP | 3054292 | 2/2017 |
| GB | 2430034 | 3/2007 |
| JP | S 55-040197 | 3/1980 |
| JP | S 58-008823 | 1/1983 |
| JP | S 58-050323 | 3/1983 |
| JP | 61-182737 | 8/1986 |
| JP | S61-202714 | 12/1986 |
| JP | H 04-081655 | 3/1992 |
| JP | H 07-168619 | 7/1995 |
| JP | H 07-180721 | 7/1995 |
| JP | H 09-133577 | 5/1997 |
| JP | H 09-229822 | 9/1997 |
| JP | H 11-183329 | 7/1999 |
| JP | 2000-266040 | 9/2000 |
| JP | 2003-222123 | 8/2003 |
| JP | 2004150974 A * | 5/2004 |
| JP | 2004-205315 | 7/2004 |
| JP | 2004-522244 | 7/2004 |
| JP | 2004294348 A * | 10/2004 |
| JP | 2006-078203 | 3/2006 |
| JP | 2016-061430 | 4/2016 |
| JP | 2016-145712 | 8/2016 |
| KR | 10-0764092 | 9/2007 |
| KR | 100764092 | 10/2007 |
| KR | 20150103037 | 9/2015 |
| KR | 1020150103037 | 9/2015 |
| RU | 2391656 | 6/2010 |
| WO | WO 2012035169 | 3/2012 |
| WO | WO2012040722 A2 | 3/2012 |
| WO | WO 2013159840 | 10/2013 |
| WO | WO 2015178821 | 11/2015 |

OTHER PUBLICATIONS

Dvorak, "Keeping Book on Bearing Health," Machine Design, Penton Media, Cleveland, OH, Apr. 20, 1989, XP 000051358, 61(8):99-104.

EP Extended Search Report in European Appln. No. 18805748.3, dated Apr. 14, 2021, 10 pages.

EP Partial Search Report in European Appln. No. 18805748.3, dated Jan. 26, 2021, 12 pages.

Mistras, World of NDT Solutions, R15a Sensor General Purpose, 150 kHz Resonant Frequency Acoustic mission Sensor, 2010, retrieved from URL <http://pacjapan.com/pacjapan_products/AE%20Sensor/PDF /RI 5-Alpha.pdf>, 1 page.

Office Action in Chinese Appln. No. 201880045135.6, dated Apr. 15, 2022, 14 pages (with English translation).

Office Action in Japanese Appln. No. 2019-564474, dated Mar. 8, 2022, 41 pages (with English translation).

PCT International Preliminary Report on Patentability in International Appln. No. PCT/US2018/033945, dated Nov. 26, 2019, 5 pages.

PCT International Search Report and Written Opinion in International Appln. No. PCT/US2018/033945, dated Aug. 30, 2018, 8 pages.

Office Action in Korean Appln. No. 10-2019-7037920, dated May 4, 2023, 16 pages (with English translation).

* cited by examiner

BEARING MONITORING/ANALYSIS SYSTEM

CROSS REFERENCE TO RELATED APPLICATIONS

This application is a continuation application of and claims priority under 35 U.S.C. § 120 to U.S. application Ser. No. 15/986,495, filed on May 22, 2018, now U.S. Pat. No. 11,255,750, which claims priority to provisional U.S. Pat. App. No. 62/509,229 filed on May 22, 2017, the entire contents of each of which are incorporated herein by reference.

FIELD OF INVENTION

The present invention relates to rotating equipment, and more specifically, to a monitoring/analysis system and method for non-intrusive damage detection for fluid film bearings and other rotating equipment.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Non-intrusive methods for detecting damage and/or assessing performance of bearings are highly desirable, as such methods may allow personnel to collect crucial information regarding the bearing while the equipment is still operating. Avoiding expensive maintenance incidents and/or costly shutdowns to inspect or repair a bearing may result in many thousands of dollars saved each year at a single facility.

Regarding fluid film bearings, which are designed for unlimited life, fluid film bearing surface wear happens for reasons such as start-up/shut down, impact loading, misalignment, edge loading, debris, erosion, corrosion, etc. Pads, lobes, and faces (bearing surfaces) must be inspected visually for wear during scheduled or unscheduled maintenance. If fluid film bearing wear could be detected non-intrusively for customer's critical applications and machinery during operating, equipment reliability and uptime could be increased, maintenance cycle times could be extended, and surprises, such as unscheduled shut downs, loss of production, increased maintenance time and effort, could be avoided.

Acoustic emission is an elastic wave produced as a result of a swift discharge of energy from a source within a material that is compelled by an externally applied stimulus. Acoustic emission signals may correspond to elastic waves or signals in the range from 5 to 1000 kHz, and the frequency range may be higher than the vibration analysis range and lower than the ultrasonic testing range.

Acoustic emission monitoring and analysis has been applied in various fields to detect failure of certain types of equipment. For example, U.S. Pat. No. 4,884,449; WO 2015178821; and WO 2013159840 all disclose using acoustic emission to detect failure of a rolling element bearing. However, acoustic emission monitoring and analysis has yet to be applied to fluid film bearings, a field in which the acoustic emission detection and analysis is extremely disparate to that of rolling element bearings due to the continual presence of fluid between rotating and stationary elements of fluid film bearings.

BRIEF DESCRIPTION OF THE FIGURES

The accompanying drawings, which are incorporated in and constitute a part of this specification, illustrate embodiments and together with the description, serve to explain the principles of the methods and systems.

DETAILED DESCRIPTION - LISTING OF ELEMENTS

Figure 1:
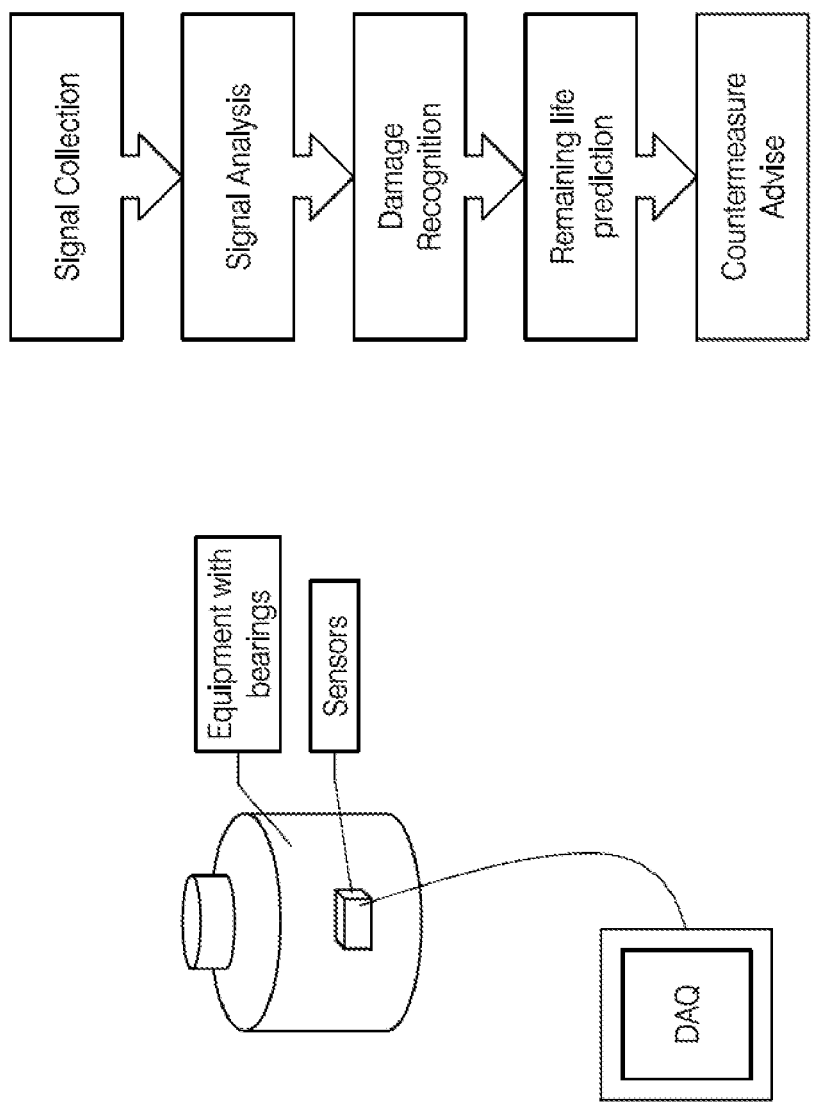
FIG. 1 provides a schematic view of an illustrative embodiment of a bearing monitoring/analysis system.

| ELEMENT DESCRIPTION | ELEMENT # |
| --- | --- |
| Sensor | 10 |
| Tilt pad journal bearing | 20 |
| Flexure Pivot tilt pad journal bearing | 20a |
| Tilt pad thrust bearing | 20b |
| Plane journal bearing | 20c |
| Taper land thrust face | 20d |
| Pad | 30 |
| Active bearing surface | 32 |
| End plate | 40 |
| Main body | 50 |

DETAILED DESCRIPTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes⁻ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description.

Before the various aspects of the present disclosure are explained in detail, it is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

Referring now to the drawings, wherein like reference numerals designate identical or corresponding parts throughout the several views, FIG. 1 provides a schematic view of an illustrative embodiment of a bearing monitoring/analysis system. Generally, a bearing monitoring/analysis system may be configured to apply acoustic emission ("AE") technology to fluid film bearings. A bearing monitoring/analysis system may be configured such that it may collect data regarding the condition, operating parameters, performance, remaining useful operating period, and/or other information about a bearing (or other machinery component wherein a first surface moves relative to a second surface with a fluid medium therebetween) in a non-intrusive manner while the equipment associated with the bearing is operating and/or is in an assembled condition but not operating. Currently, this type of data and/or information must be collected in an intrusive manner (wherein the equipment associated with the bearing must be powered down and not operating) during scheduled or emergency maintenance, at which point the damage to the bearing and/or other associated components may be severe and may have resulted in loss of productivity. The specific data/information regarding a bearing and/or component thereof collected via a bearing monitoring/analysis system according to the present disclosure may comprise any useful information, and the scope of the present disclosure is in no way limited to any specific information and/or set of information unless so indicated in the following claims.

Additionally, a bearing monitoring/analysis system may be configured such that it may monitor the condition of other components of a bearing (or other piece of rotating equipment and/or machinery component as described in further detail below). Such other components include, but are not limited to, bearing pads, pad pivot surfaces (either on a surface of a pad 30 opposite to or other than the active surface 32), or another component and/or surface on a component of the bearing (e.g., carrier ring, piston, pad holding, and/or support structure, etc.) and/or other surfaces of a bearing or piece of rotating equipment in which there is relative movement between two surfaces without limitation unless so indicated in the following claims.

A bearing monitoring/analysis system may be configured to track changes of the active surface of the bearing (among other data) from an early stage to offer information regarding the bearing not available in the prior art. Specifically, data collected via AE, which data includes but is not limited to hit driven data (data collected when the signal exceeds a specific threshold), time driven signal (data collected at a specific time interval), and waveform signal (data collected for from more than one source for a given length of time at a specific interval), and/or combinations thereof, may be interpreted and/or analyzed to detect differing degrees and/or types of bearing surface damage, type and/or specific location of damage, performance, conditions, etc., and may be used to predict the remaining life of the bearing such that preventative countermeasures may be advised accordingly.

Generally, a bearing monitoring/analysis system may be configured to collect acoustic emission signal(s) from a bearing, analyze the signal(s) to gain useful information about the bearing and/or component thereof, and provide a suggested course of action considering the information gained. In one application, the information about the bearing and/or component thereof may be a type, severity, and/or location of damage to the bearing and/or component thereof (e.g., an active surface of a bearing, which active surface may be positioned on a pad). In another application, alternatively or additionally, the information about the bearing and/or component thereof may be the predicted remaining life of the bearing and/or component thereof. Again, the scope of the present disclosure extends to all useful information regarding a bearing and/or component thereof that may be collected via AE without limitation unless so indicated in the following claims.

A bearing monitoring/analysis system may be configured for nearly any different type of fluid film bearings, including but not limited to fixed geometry and tilt pad journal bearings; fixed geometry and tilt pad thrust bearings; fluid film bearings having relatively hard coatings on or adjacent to active surfaces thereof (which bearings may allow for relatively thinner films and higher operating temperatures) and/or fluid film bearings configured for use with rotating components having relatively hard coatings thereon; polymer bearings (either solid polymer pads or solid polymer bearing); babbitt bearings; bearings configured with pads having one or more jacking grooves (and/or hydrostatic lift pockets) thereon; Flexure Pivot® bearings; fluid film bearings employing any type of lubrication (e.g., direct lubrication, flooded, evacuated, etc.); any type of lubricant (e.g., oil, water, air, process fluids, etc.); any fluid film bearing with alternative material(s) positioned on the pad or bearing surface regardless of the method/structure used for attaching the alternative material to the pads; any number of pads (tilt or fixed); any bearing grade material pad; any size of bearing; and any shape and/or style of pad (e.g., fixed or tilt). Accordingly, the scope of the present disclosure is in no way limited by the specific type of fluid film bearing unless so indicated in the following claims. Additionally, a bearing monitoring/analysis system may be used in conjunction with other technologies, including but not limited to ultrasound. Finally, the concepts of a bearing monitoring/analysis system may be applied to machinery components in contact with fluid other than bearings, such machinery components including but not limited to seals, valves and sliding surfaces, and/or rotating surfaces, etc. Accordingly, the scope of the present disclosure extends to any use of the bearing monitoring/analysis system to detect a condition/parameter of at least one of two or more adjacent surfaces that move relative to one another during operation of a machinery component without limitation unless so indicated in the following claims.

The scope of the bearing monitoring/analysis system extends to any fluid film bearing configured in any orientation, any number or configuration of pads 30 and/or active surface 32, and/or with different quantities of the various elements having different shapes and/or orientations, equally or unequally spaced from other elements unless otherwise indicated in the following claims. Additionally, the scope of the present disclosure is in no way limited by the specific shape, configuration, and/or dimensions of the above elements, and/or the relative quantities and/or positions thereof unless otherwise indicated in the following claims.

Figure 2:
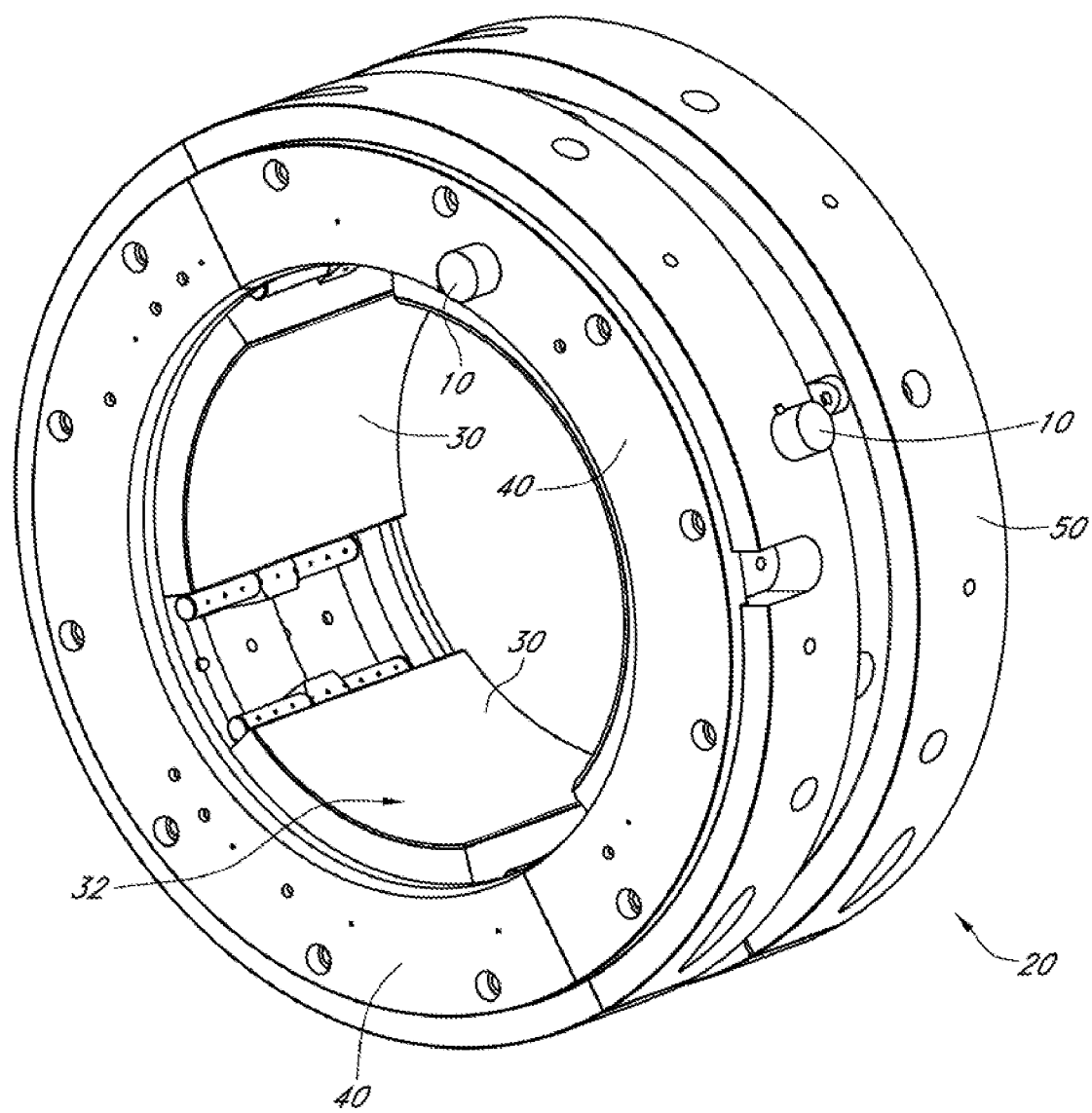
FIG. 2 provides a perspective view of an illustrative embodiment of a bearing a monitoring/analysis system.

Referring now to FIG. 2, a bearing monitoring/analysis system may be configured for use with a tilt pad journal bearing 20, as mentioned above. The tilt pad journal bearing 20 may have any number of pads 30 having any number of active surfaces 32 thereon without limitation unless so indicated in the following claims. In such a configuration, a first sensor 10 may be positioned on a radial-external surface of the main body 50 and a second sensor 10 may be positioned on an end plate 40 (which constitutes an axial surface of the tilt pad journal bearing 20). Additional sensors 10 may also be included to increase monitoring system capability and to add redundancy, as further discussed below.

Figure 3:
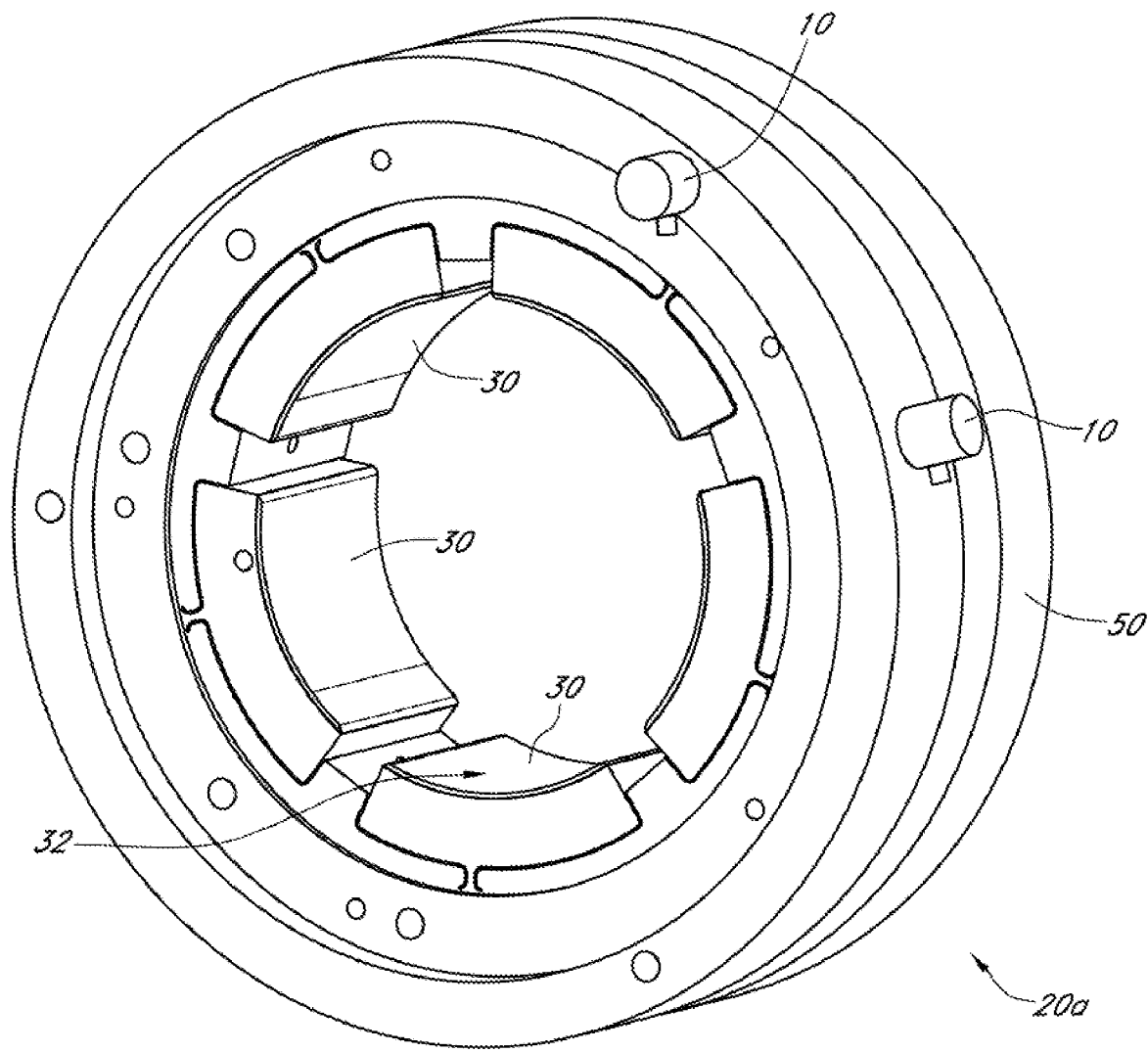
FIG. 3 provides a perspective view of another illustrative embodiment of a bearing monitoring/analysis system.
Figure 3A:
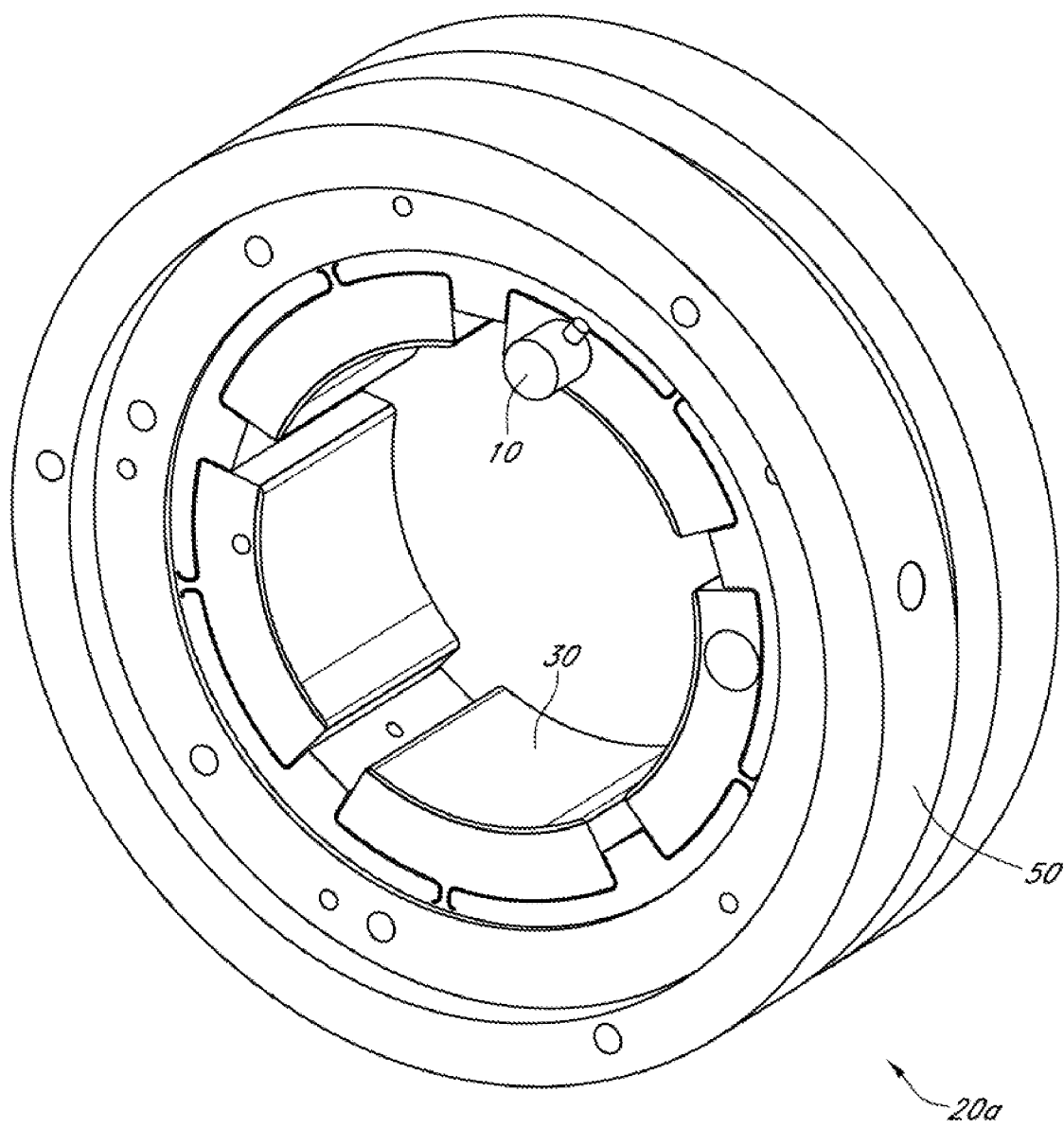
FIG. 3A provides a perspective view of another illustrative embodiment of a bearing monitoring/analysis system.

Referring now to FIG. 3, a bearing monitoring/analysis system may be configured for use with a Flexure Pivot tilt pad journal bearing 20a, as mentioned above. The Flexure Pivot tilt pad journal bearing 20a may have any number of pads 30 having any number of active surfaces 32 thereon without limitation unless so indicated in the following claims. In such a configuration, a first sensor 10 may be positioned on a radial-external surface of the main body 50 and a second sensor 10 may be positioned on an axial surface of the main body 50 and/or other axial surface of the Flexure Pivot tilt pad journal bearing 20a. Again, additional sensors 10 may also be included to increase monitoring system capability and to add redundancy. Furthermore, one or more sensors may be attached to a pad or more than one pad. In FIG. 3A, the sensor 10 is located on the pad. Additional sensors may be located on this pad or any other pad in the bearing. This application of a sensor on a pad is applicable to all types of bearings in addition to the Flexure Pivot embodiment without limitation unless so indicated in the following claims.

Figure 4:
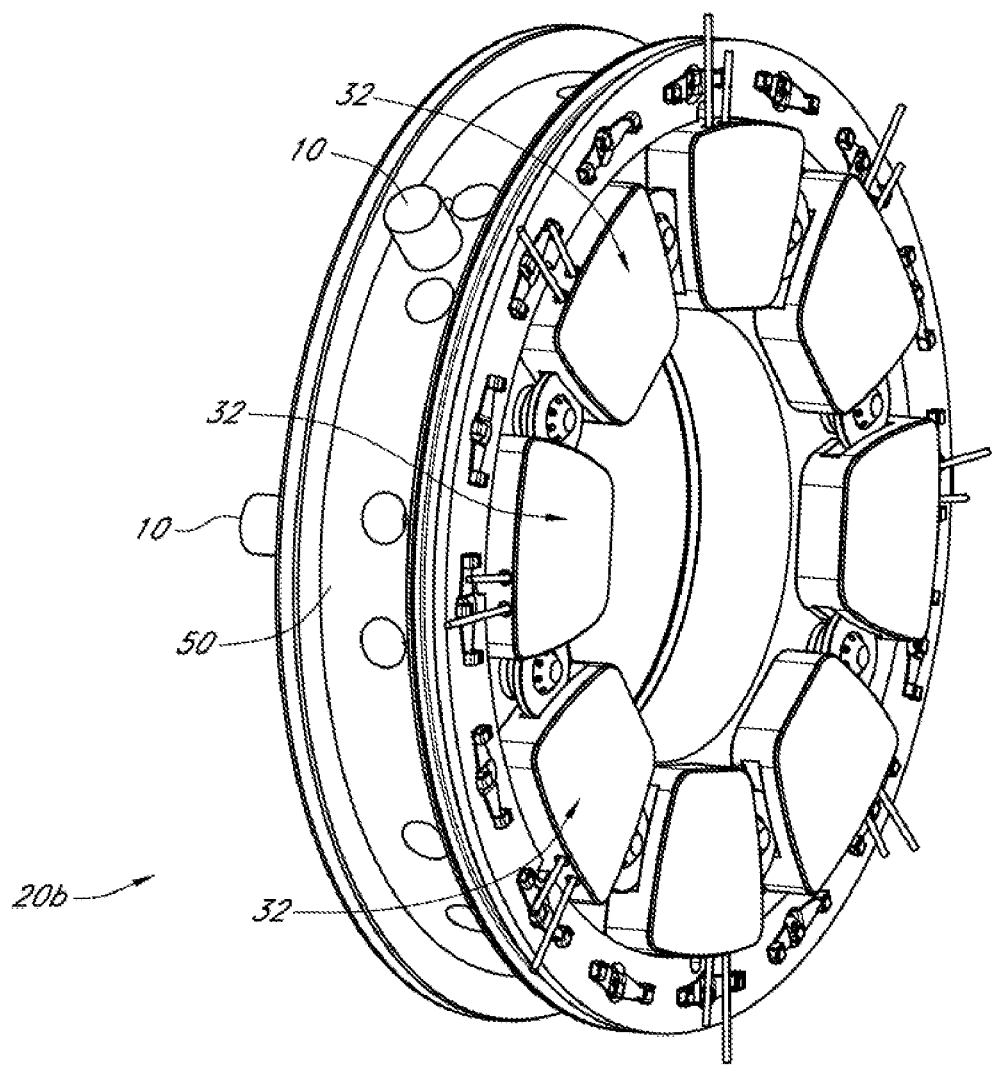
FIG. 4 provides a perspective view of another illustrative embodiment of a bearing monitoring/analysis system.

Referring now to FIG. 4, a bearing monitoring/analysis system may be configured for use with a tilt pad thrust bearing 20b, as mentioned above. In such a configuration, a first sensor 10 may be positioned on a radial-external surface of the main body 50 (and/or pad carrier ring) and a second sensor 10 may be positioned on an axial surface of the main body 50 and/or other axial surface of the tilt pad thrust bearing 20a (e.g., an axial surface of the pad carrier ring). Again, a second sensor 10 is shown in this embodiment, but a single sensor 10 may be used.

It is contemplated that in certain applications of a bearing monitoring/analysis system configured for use with thrust bearings (either tilt or fixed) it may be advantageous to position the sensor 10 associated with an axial surface of the bearing on an axial surface thereof that is opposite the pads 30, which configuration is shown in FIG. 4. However, the optimal position of any of the sensors 10 with respect to any pad 30 and/or active surface 32 may vary from one application of a bearing monitoring/analysis system to the next and is therefore in no way limiting to the scope thereof unless so indicated in the following claims. Additionally, the number of sensors 10 may vary from application to application to increase bearing monitoring/analysis system capability and accuracy and to add redundancy, and is therefore in no way limiting to the scope thereof unless so indicated in the following claims.

Figure 5:
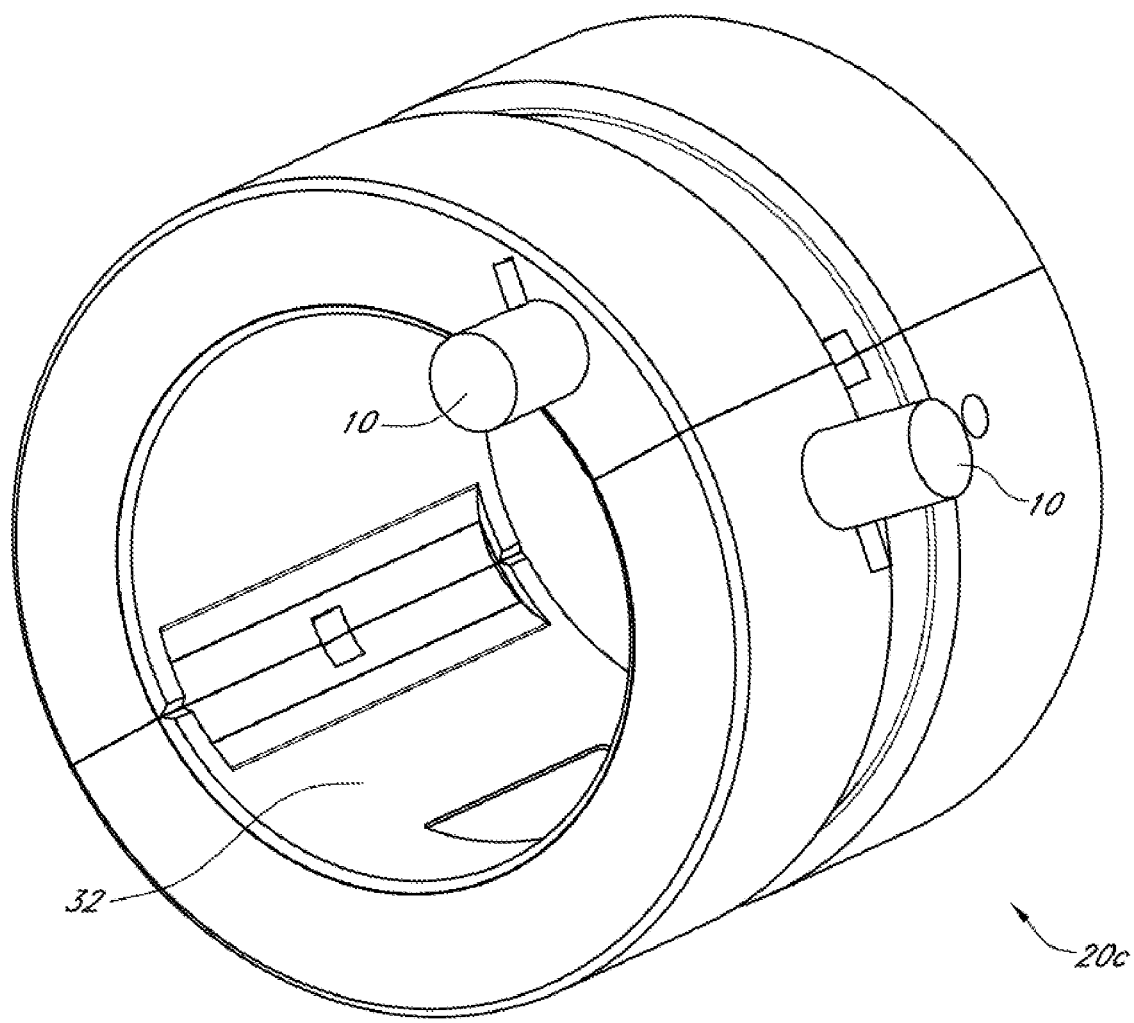
FIG. 5 provides a perspective view of another illustrative embodiment of a bearing monitoring/analysis system.

Referring now to FIG. 5, a bearing monitoring/analysis system may be configured for use with a plane journal bearing 20c, as mentioned above. The plane journal bearing 20c may have any number of surface features (grooves, indentations, etc.) on the active surface(s) 32 and any number of lobes, faces, etc., thereof without limitation unless so indicated in the following claims. In such a configuration, a first sensor 10 may be positioned on a radial-external surface of the main body 50 and a second sensor 10 may be positioned on an axial surface of the main body 50. Again, additional sensors 10 may also be included to increase monitoring system capability and to add redundancy, and is therefore in no way limiting to the scope thereof unless so indicated in the following claims.

Figure 6:
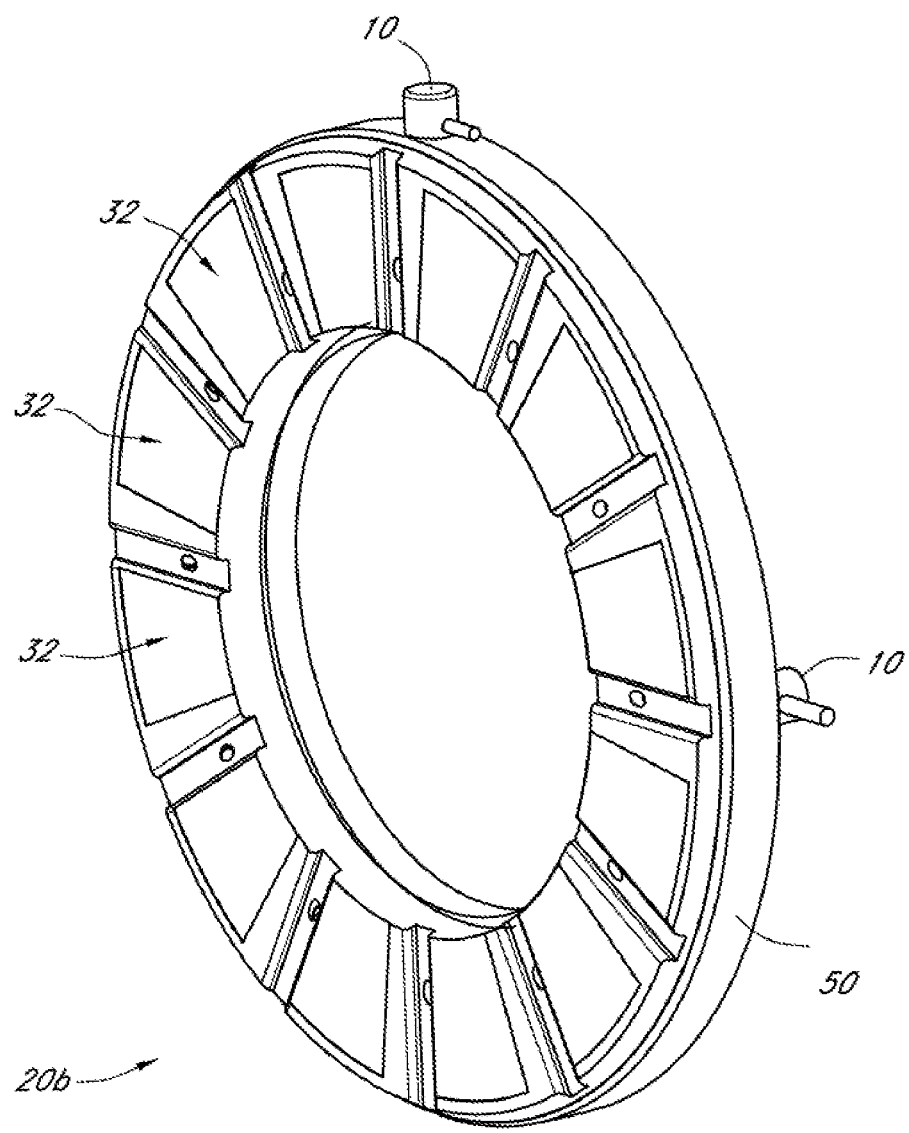
FIG. 6 provides a perspective view of another illustrative embodiment of a bearing monitoring/analysis system.

Referring now to FIG. 6, a bearing monitoring/analysis system may be configured for use with a fixed geometry thrust bearing 20d, shown as a taper land thrust plate in FIG. 6. The taper land thrust bearing 20d may have any number of surface features (grooves, tapers, flats, lands, indentations, etc.) on the active surfaces 32 and any number of feed grooves, faces, etc., thereon without limitation unless so indicated in the following claims. In such a configuration, a first sensor 10 may be positioned on a radial-external surface of the main body 50 and a second sensor 10 may be positioned on an axial surface of the main body 50. Additional sensors 10 may also be included to increase monitoring system capability and to add redundancy.

Although two sensors 10 are shown in each of the illustrative embodiments of a bearing monitoring/analysis system depicted in FIGS. 2-6, wherein the two sensors 10 are in relatively close proximity to one another and a first sensor is engaged with a radial surface and a second sensor is engaged with an axial surface, the scope of the present disclosure is not so limited unless indicated in the following claims. In other embodiments the bearing monitoring/analysis system may comprise just one sensor 10, and still further embodiments it may comprise more than two sensors 10. In another embodiment, a first sensor 10 may be positioned 180 degrees from a second sensor 10. In still another embodiment, the bearing monitoring/analysis system may comprise three sensors 10 (or four, five, six, etc.) evenly spaced about the circumference of the bearing. Alternatively, a first sensor 10 may be positioned 90 degrees from a second sensor 10. In still another embodiment, a first axially positioned sensor 10 may be positioned 180 degrees from a second axially positioned sensor 10 and a first radially positioned sensor 10 may be positioned 180 degrees from a second radially positioned sensor 10.

Additionally, the optimal position of the sensor 10 with respect to pads 30, active surfaces 32, and/or other components of a bearing may vary from one application to the next, which position may depend at least upon the type of sensor 10 employed. In one embodiment of a bearing monitoring/analysis system, one or more sensors may be engaged with an equipment housing associated with a bearing (or other piece of rotating equipment). Accordingly, although in FIGS. 2-6 one sensor 10 is oriented on an axial surface of a bearing and a second sensor 10 is oriented on a radial surface of a bearing, the scope of the present disclosure is not so limited and extends to any number of sensors 10 in any orientation with respect to the bearing and/or the other sensors 10 without limitation unless so indicated in the following claims.

Furthermore, the sensors 10 need not be affixed to the bearing itself for certain applications, but may be engaged with any structure that is suitably positioned with respect to the bearing such that the sensor 10 may detect/collect suitable AE from the point of interest without limitation unless so indicated in the following claims. For example, in one embodiment a sensor 10 may be positioned adjacent to the bearing on a fixture and/or equipment housing to which the bearing is secured.

It is contemplated that a sensor 10 may be engaged with a bearing 20, 20a, 20b, 20c, component thereof, or other suitable structure using chemical adhesives, mechanical fasteners, magnets, and/or combinations thereof. However, a sensor 10 may be engaged with a bearing 20, 20a, 20b, 20c, component thereof, or other suitable structure using any suitable method and/or structure currently known or later developed without limitation unless so indicated in the following claims.

Applicant has tested a bearing monitoring/analysis system on a 15-inch tilt pad journal bearing 20 to evaluate the effect of bearing speed and load on AE signals using a three-speed and three-load matrix. The specific equipment configuration, testing procedures/parameters, resulting test data, and other information regarding these experiments are not included for purposes of brevity.

Applicant has tested a bearing monitoring/analysis system on a tilt pad thrust bearing 20b (model VSC 460) to evaluate the effect of bearing speed and load on AE signals and to evaluate the sensitivity of AE signals to pad damage. In this test, data was collected when all pads were in good operating conditions, after one pad had been intentionally damaged, and after two pads were intentionally damaged to compare the effect of pad damage on AE signals. The specific equipment configuration, testing procedures/parameters, resulting test data, and other information regarding these experiments are not included for purposes of brevity.

The results and findings from the testing of the tilt pad journal bearing 20 and tilt pad thrust bearing 20b are not included for purposes of brevity. Through testing, Applicant has found that for certain applications, a sensor configured as an R15a general purpose AE sensor 10 may be suitable for certain bearing monitoring/analysis systems. However, the scope of the present disclosure is not so limited and extends to any structure and/or method for detecting AE signals without limitation unless so indicated in the following claims.

Although the experiments, results, and illustrative embodiments are quite specific regarding parameters, equipment configuration, results, etc., this information is in no way meant to limit the scope of the present disclosure, and is instead meant to illustrate reduction to practice of the broader principles disclosed herein. Accordingly, the scope of the present disclosure is in no way limited by limitations and/or configurations disclosed herein relating to the experimental parameters and/or results unless otherwise indicated in the following claims.

The materials used to construct the bearing monitoring/analysis system and/or components thereof will vary depending on the specific application thereof, but it is contemplated that polymers, synthetic materials, metals, metal alloys, ceramics, natural materials, and/or combinations thereof may be especially useful in some applications. Accordingly, the above-referenced elements may be constructed of any material known to those skilled in the art or later developed, which material is appropriate for the specific application of the bearing monitoring/analysis system without departing from the spirit and scope of the present disclosure unless so indicated in the following claims.

Having described preferred aspects of the various methods and apparatuses, other features of the present disclosure will undoubtedly occur to those versed in the art, as will numerous modifications and alterations of the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure unless so indicated in the following claims. Furthermore, the methods and embodiments pictured and described herein are no way limiting to the scope of the present disclosure unless so stated in the following claims.

Although FIGS. 2-6 are drawn to accurate scale, any dimensions provided herein are for illustrative purposes only and in no way limit the scope of the present disclosure unless so indicated in the following claims. It should be noted that the bearing monitoring/analysis system, components thereof, and/or methods of using same according to the present disclosure are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, etc. of the bearing monitoring/analysis system, component thereof, and/or methods of using same according to the present disclosure may be used alone or in combination with one another depending on the compatibility of the features, components, functionalities, advantages, aspects, configurations, etc. Accordingly, a nearly infinite number of variations of the present disclosure exist. Modifications and/or substitutions of one feature, component, functionality, aspect, configuration, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the bearing monitoring/analysis system, method, components thereof, and/or methods of using same according to the present disclosure have been described in connection with preferred aspects and specific examples, it is not intended that the scope be limited to the particular embodiments and/or aspects set forth, as the embodiments and/or aspects herein are intended in all respects to be illustrative rather than restrictive unless otherwise indicated in the following claims.

Unless otherwise expressly stated in the claims, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. A system comprising:
    a fluid film bearing comprising one or more components;
    a lubricant disposed on the fluid film bearing between the fluid film bearing and a running surface; and
    one or more acoustic emission sensors positioned on a surface of at least one of the one or more components of the fluid film bearing, wherein at least one of the one or more acoustic emission sensors is configured to collect data from the fluid film bearing regarding a condition of at least one of the one or more components of the fluid film bearing,
    wherein:
    at least one of the one or more acoustic emission sensors is on a pad of the fluid film bearing, and
    the at least one acoustic emission sensor is configured to collect data from the fluid film bearing regarding a condition of the pad.

2. The system of claim 1, wherein the running surface is on a rotating shaft.

3. The system of claim 1, wherein at least one of the one or more acoustic emission sensors is on a housing of the fluid film bearing.

4. The system of claim 1, wherein:
    the at least one or more acoustic emission sensors comprises two or more acoustic emission sensors,
    at least one of the two or more acoustic emission sensors is on a housing of the fluid film bearing, and
    the at least one acoustic emission sensor on the housing is configured to collect data from the fluid film bearing regarding a condition of one or more pads of the fluid film bearing.

5. The system of claim 1, wherein
    the condition comprises a-damaged to the pad of the fluid film bearing.

6. The system of claim 1, wherein the lubricant comprises oil.

7. The system of claim 1, wherein the fluid film bearing comprises a multi-lobe journal bearing.

8. The system of claim 1, wherein the fluid film bearing comprises a thrust bearing.

9. The system of claim 1, wherein the fluid film bearing comprises a tapered land thrust bearing.

10. The system of claim 1, wherein the fluid film bearing comprises tilt pad fluid film bearing.

11. A method, comprising:
    positioning one or more acoustic emission sensors on a surface of at least one of the one or more components of a fluid film bearing, wherein at least one of the one or more acoustic emission sensors is on a pad of the fluid film bearing;
    delivering a lubricant between one or more pads of the fluid film bearing and a running surface; and
    collecting, from signal received from the at least one acoustic emission sensor, data from the fluid film bearing regarding a condition of the pad.

12. The method of claim 11, wherein the lubricant comprises oil.

* * * * *